(12) United States Patent
Kim et al.

(10) Patent No.: US 10,476,639 B2
(45) Date of Patent: Nov. 12, 2019

(54) USER ASSIGNMENT OF RESOURCE BLOCKS IN A PREAMBLE

(71) Applicant: Apple Inc., Cupertino, CA (US)

(72) Inventors: Joonsuk Kim, Saratoga, CA (US); Guoqing Li, Cupertino, CA (US); Syed Aon Mujtaba, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 473 days.

(21) Appl. No.: 15/146,087

(22) Filed: May 4, 2016

(65) Prior Publication Data

US 2016/0330718 A1 Nov. 10, 2016

Related U.S. Application Data

(60) Provisional application No. 62/157,333, filed on May 5, 2015.

(51) Int. Cl.
*H04W 72/04* (2009.01)
*H04L 5/00* (2006.01)

(52) U.S. Cl.
CPC .......... *H04L 5/0007* (2013.01); *H04L 5/0091* (2013.01)

(58) Field of Classification Search
CPC .............................. H04L 5/0007; H04L 5/0091
See application file for complete search history.

(56) References Cited

U.S. PATENT DOCUMENTS

| | | | |
|---|---|---|---|
| 8,428,606 B1 * | 4/2013 | Vrzic | H04W 72/0406 370/335 |
| 8,767,374 B2 | 7/2014 | Masuda | |
| 8,767,637 B2 | 7/2014 | Novak et al. | |
| 9,455,810 B2 | 9/2016 | Chen et al. | |
| 9,716,579 B2 | 7/2017 | Azizi et al. | |
| 9,755,795 B2 | 9/2017 | Aboul-Magd et al. | |
| 2016/0073392 A1 * | 3/2016 | Byun | H04W 72/048 370/280 |
| 2016/0309473 A1 | 10/2016 | Kim et al. | |
| 2017/0339701 A1 * | 11/2017 | Choi | H04L 5/00 |

* cited by examiner

*Primary Examiner* — Mandish K Randhawa
(74) *Attorney, Agent, or Firm* — Sterne, Kessler, Goldstein & Fox P.L.L.C.

(57) ABSTRACT

Disclosed herein are system, method, and computer program product embodiments for providing an efficient way to assign resource blocks to user receiver devices in a wireless communications protocol. For example, the method can receive a frame for a wireless communications protocol. The method can also extract a unique value from a tone mapping field in a preamble of the frame. The method can also look up a resource block allocation for a portion of the tone space in a lookup table using the unique value. Further, the method can extract an assignment field from the preamble based on the determined resource block allocation. The method can also determine an assigned resource block number based on the assignment field. The method can also assign a resource block corresponding to the assigned resource block number to a user receiver device.

17 Claims, 8 Drawing Sheets

| Resource Block Position | 0 | 1 | 2 | 3 | 4 | 5 | 6 | 7 | 8 | 9 | 10 | 11 |
|---|---|---|---|---|---|---|---|---|---|---|---|---|
| Assignment | 1 | 0 | 0 | 1 | 1 | 0 | 1 | 0 | 0 | 1 | 0 | 1 |

User 601 →
12 Bits

| Resource Block Position | 1 | 2 | 5 | 7 | 8 | 10 |
|---|---|---|---|---|---|---|
| Assignment | 0 | 1 | 1 | 0 | 1 | 1 |

User 602 →
6 Bits

| Resource Block Position | 1 | 7 |
|---|---|---|
| Assignment | 1 | 0 |

User 603 →
2 Bits

FIG. 6

USER ASSIGNMENT OF RESOURCE BLOCKS IN A PREAMBLE

CROSS-REFERENCE TO RELATED APPLICATION

The present application claims benefit of provisional U.S. Patent Application No. 62/157,333, titled "Resource-Unit User-Device Assignments in OFDMA" filed on May 5, 2015, which is incorporated herein by reference in its entirety.

BACKGROUND

Technical Field

The disclosed embodiments relate to the field of wireless communications, including user assignment of resource blocks in wireless communications.

Background

Many wireless communication protocols modulate data using a multicarrier modulation scheme. For example, Orthogonal Frequency-Division Multiple Access (OFDMA) is a common multicarrier modulation scheme. In a multicarrier modulation scheme, such as OFDMA, a wireless channel is divided into multiple tones. Each tone occupies a portion of the wireless channel bandwidth. During a transmission, data can be carried over the multiple tones in parallel.

To schedule the transmission, a plurality of tones can be grouped into resource blocks. Each resource block may contain a standard number of tones and may be assigned to a specific user receiver device.

To receive the transmission, a receiver device needs to know the resource block assigned to it. This resource block assignment may be specified in to preamble field of a wireless frame. However, because there may be a large number of possible resource block mappings to receiver devices, the preamble may be large. But the transmission of a large preamble may increase power consumption and consequently reduce battery life in the receiver device, e.g., a portable electronic device. Moreover, additional compute processing may be necessary to decode a large preamble. This may also increase power consumption.

SUMMARY

According to some embodiments, a signaling mechanism is utilized to efficiently map a resource block to a receiver device in a wireless communications protocol, e.g., a proposal for the Institute of Electrical and Electronics Engineers (IEEE) 802.11ax standard.

In some embodiments, the receiving device receives a frame for a wireless communications protocol. The receiving device extracts a unique value from a tone mapping field stored in a preamble of the frame. The tone mapping field includes the unique value that indicates a resource block allocation combination. The receiving device looks up a resource block allocation in a lookup table using the unique value. After retrieving the associated resource block allocation from the lookup table, the receiving device maps tones from a portion of the tone space for the wireless communications protocol to resource blocks.

In some embodiments, the number of tones for the wireless communications protocol is based at least in part on a 20 MHz channel. In some embodiments, when the receiving device extracts a unique value from the tone mapping field, it looks up the resource block allocation for the 20 MHz channel.

In some embodiments, the number of tones for the wireless communications protocol is based at least in part on an 80 MHz channel. In some embodiments, the number of tones is divided up into a plurality of portions. For example, a portion of the plurality of portions may be a band of 20 MHz.

In some embodiments, a unique value stored in the tone mapping field indicates a resource block allocation combination for a portion of the plurality of portions. When the receiving device extracts a unique value from the tone mapping field, it looks up the resource block allocation for an associated portion of the tone space. Because a unique value of the tone mapping field is associated with a portion of the tone space, a size of the tone mapping field can be based at least in part on a size of the portion of the tone space. For example, a size of a portion of the tone space may be a 20 MHz band instead of an 80 MHz channel.

In some embodiments, the receiving device extracts a user identification field and an assignment field stored in the preamble of the frame. The receiving device calculates a size of the assignment field based on the resource block allocation.

In some embodiments, the receiving device determines the assignment of resource blocks to user receiver devices based on the user identification field and the assignment field. In some embodiments, the assignment field may store K assignments of resource blocks to user receiver devices. The K resource block assignments may be stored in turn in the assignment field. In addition, the K resource block assignments may be stored in the same order as the corresponding user receiver devices are stored in the user identification field. Thus, in some embodiments, the receiving device extracts a portion of the assignment field corresponding to a user receiver device in the user identification field.

In some embodiments, the assignment field may represent a contiguous resource block assignment. The receiving device may determine a resource block assignment based directly on a resource block number stored in the extracted portion of the assignment field. The receiving device may calculate the bit length of the extracted portion of the assignment field based on the determined resource block allocation.

In some embodiments, the assignment field may represent a non-contiguous resource block assignment. The receiving device may determine a resource block assignment based on a series of bitmaps stored in the assignment field. Specifically, the receiving device may determine a resource block assignment for as user receiver device by extracting the series of bitmaps in turn from the assignment field. The receiving device may calculate the length of each bitmap in the assignment field based on the determined resource block allocation.

In some embodiments, the receiving device determines the assigned resource blocks for a first user receiver device from the corresponding bitmap in the assignment field. The receiving device may also calculate the unassigned resource blocks for the first user receiver device. The receiving device may remove from consideration the assigned bit locations from the corresponding bitmap for the next user receiver device in the assignment field. The receiving device may determine the assigned resource blocks for next user receiver device in view of the removed bit locations from the corresponding bitmap.

In some embodiments, the receiving device assigns resource blocks to the corresponding user receiver devices based on the determined user resource block assignment.

Other features of the present disclosure will be apparent from the accompanying drawings and from the detailed description, which follows.

BRIEF DESCRIPTION OF THE DRAWINGS

The accompanying drawings are incorporated herein and forth a part of the specification.

FIG. 6 is a block diagram of an example non-contiguous resource block assignment for a WLAN, according to some embodiments.

In the drawings, like reference numbers generally indicate identical or similar elements. Additionally, generally the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing efficient resource block assignment(s) to user receiver devices in a wireless communications protocol. In some embodiments, the method operates by receiving a frame for the wireless communications protocol. The method can also extract a unique value from a tone mapping field in a preamble of the frame. The method can also look up a resource block allocation for a portion of the tone space in a lookup table using the unique value. The method can also extract an assignment field based on the resource block allocation. The method can also determine an assigned resource block number based on the assignment field. The method can also assign a resource block corresponding to the assigned resource block number to a user receiver device. Because resource block assignment is based on the tone mapping field, and the tone mapping field is based on the number of different tone mapping combinations, the size of the preamble can be kept relatively small which facilitates efficient resource block assignment.

Figure 1:
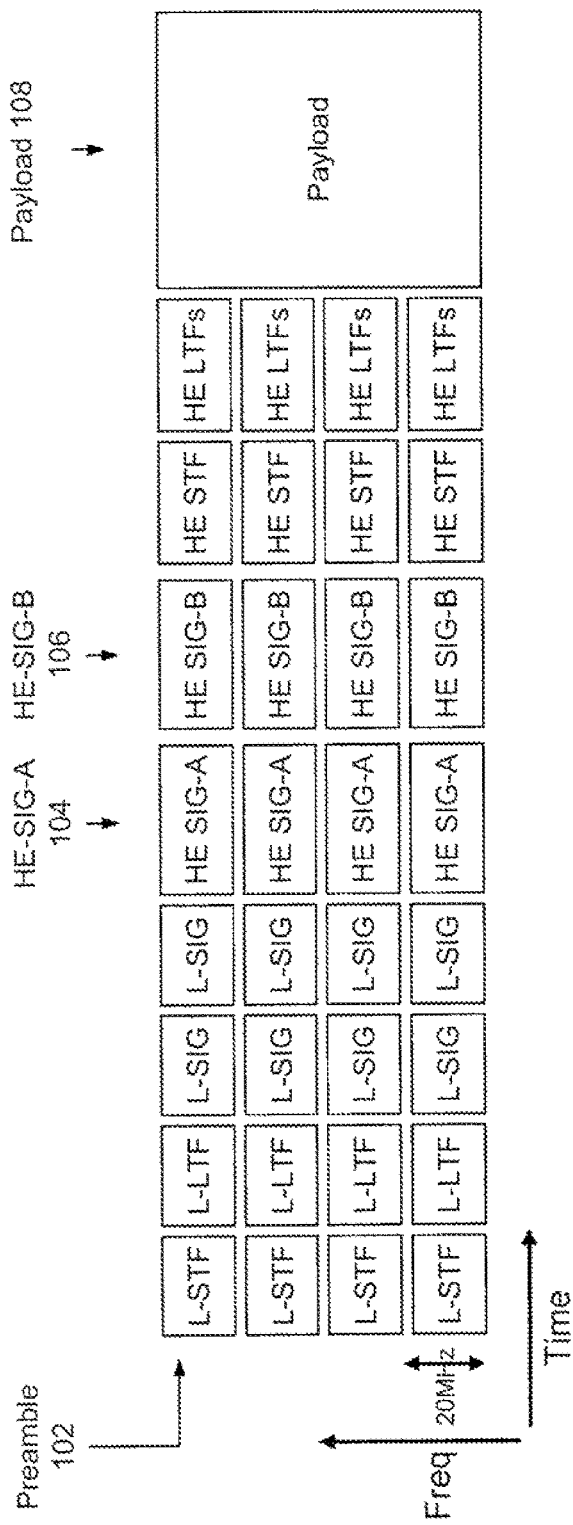
FIG. 1 is a block diagram of an example frame that provides tone mapping signaling for a wireless local area network (WLAN), according to some embodiments.

FIG. 1 is a block diagram of an example frame 100 that provides a frame structure for a wireless local area network (WLAN), according to some embodiments. For example, in some embodiments, a WLAN may use a proposal for the IEEE 802.11ax standard of various other wireless communications protocols. In some embodiments, frame 100 may be transmitted according to an Orthogonal Frequency-Division Multiple Access (OFDMA) multicarrier modulation scheme or various other modulation schemes. A person of ordinary skill in the art would appreciate that the resource block assignment technique may be used with other wireless communication protocols and modulation schemes.

In some embodiments, frame 100 includes a preamble 102 and a payload 108. Preamble 102 may be a preamble for use with a proposal for the IEEE 802.11ax standard. A person of ordinary skill in the art would appreciate that the resource block assignment technique may be applied to a preamble for other wireless communications protocols. In some embodiments, payload 108 represents actual data carried within frame 100 over a WLAN.

In FIG. 1, frame 100 is transmitted over an 80 MHz channel. The 80 MHz channel is divided into four 20 MHz bands. The fields of preamble 102 are transmitted over each 20 MHz band of the 80 MHz channel. As would be appreciated by a person of ordinary skill in the art, in some embodiments, the fields of preamble 102 may be transmitted simultaneously over four 20 MHz bands of the 80 MHz channel.

As would be appreciated by a person of ordinary skill in the art, frame 100 may be transmitted over different size bands for different size channels. For example, in some embodiments, the fields of preamble 102 may be transmitted once over a single 20 MHz band of a 20 MHz channel. In some embodiments, the fields of preamble 102 may be duplicated over two 20 MHz bands of a 40 MHz channel. In some embodiments, the fields of preamble 102 may be duplicated over four 20 MHz bands of an 80 MHz channel.

In some embodiments, a channel may have a plurality of tones, where the plurality of tones may be used to carry data. The number of tones of a channel may be referred to as a "tone space." In some embodiments, the number of tones can be based on the size of the channel. For example, in FIG. 1, there may be up to 996 tones in the 80 MHz channel.

In some embodiments, to schedule transmissions to different receiver devices, tones are grouped into resource blocks and each resource block is assigned to a different receiver device. In some embodiments, a resource block may have different tone allocation sizes. For example, a resource block may include 26 tones, 52 tones, or 106 tones.

In some embodiments, different resource blocks may contain different numbers of tones. While there are a finite number of mappings of tones to resource blocks in the tone space, the number of mappings may be very large.

Thus, a tone mapping, needs to be signaled to a receiver device before payload processing, Otherwise, the receiver device will not know which resource block to process. Given that the number of mapping combinations of resource blocks is large, storing the tone mapping for the entire tone space in a preamble field may require a large number of bits for the preamble. The transmission of as large preamble may increase power consumption which in turn may reduce battery life in a portable device. Moreover, additional compute processing may be necessary to decode the large preamble, which may also increase power consumption.

In some embodiments, these technological issues are resolved by indicating the torte mapping for a portion of the tone space using a lookup table. For example, the tone mapping may be performed for each 20 MHz band, rather than an entire 80 MHz channel, using a lookup table.

In FIG. 1, preamble 102 includes several data fields. For example, in some embodiments, preamble 102 includes a High-Efficiency-Signal-A (HE-SIG-A) 104 field and a High- Efficiency-Signal-B (HE-SIG-B) 106 field. In addition, preamble 102 may include other fields specified in a proposal for the IEEE 802.11ax standard such as, for example, L-STF, L-LTF, L-SIG, HE STF, and HE LTFs fields.

In some embodiments, the HE-SIG-A 104 field includes common information provided to receiver devices. In FIG. 1, HE-SIG-A 104 field is duplicated over the four 20 MHz bands of the 80 MHz channel.

In some embodiments, HE-SIG-A 104 field may include 24 bits of information. In addition, HE-SIG-A 104 field may include several subfields within the 24 bits of information. Specifically. HE-SIG-A 104 field may include a BW subfield that indicates the channel bandwidth and a reserved subfield that indicates whether the frame is an OFDMA frame. For example, the BW subfield may indicate that the channel bandwidth is 80 MHz and the reserved field may indicate an ODFMA frame.

In some embodiments, HE-SIG-B 106 field may include several subfields of per user information. Specifically, HE-SIG-B 106 may include a tone mapping field and user specific information fields. In some embodiments, HE-SIG-B 106 field may be different over each band of the channel bandwidth. As a result, each band of the channel bandwidth is protected with separate decoding.

For example, in FIG. 1, HE-SIG-B 106 field may be different over the four 20 MHz bands of the 80 MHz channel. This is because there may be different tone mappings for different receiver devices, e.g., resource block arrangements and assignments for users, in each 20 MHz band.

In some embodiments, HE-SIG-B 106 field may be encoded across the entire channel bandwidth. For example, in some embodiments, HE-SIG-B 106 field may be encoded across an entire 40 MHz channel. In some other embodiments, HE-SIG-B 106 field may be encoded across an entire 80 MHz channel. As result, the size of HE-SIG-B 106 field may be reduced.

In some embodiments, several fields of per user information of the HE-SIG-B 106 field may be accumulated across an entire channel bandwidth. In some embodiments, the several fields of per user information may be scaled with a size of the entire channel bandwidth.

In some embodiments, because HE-SIG-B 106 is transmitted for each band of the channel, the tone mapping field needs only to indicate the tone mapping for its respective band and not across the entire bandwidth. As a result, the size of the tone mapping field may be reduced.

In some embodiments, the size of the tone mapping field can be further reduced by representing the tone mapping for a band using a unique value assigned to each tone mapping combination. In some embodiments, the tone mapping field may be sized according to the number of different resource block allocations possible in a given band. Moreover, a given resource block allocation may be represented as a unique value in the tone mapping field. Thus, in some embodiments, a receiver device may determine the current tone mapping for a given band by extracting the unique value from the tone mapping field and by looking up the corresponding tone mapping in a lookup table using the unique value. As would be appreciated by a person of ordinary skill in the art, the actual tone mapping may be encoded in the lookup table in various ways. Moreover, as would be appreciated by a person of ordinary skill in the art, the lookup table may be implemented as a hash table, array, linked list, or various other data structures.

For example, in FIG. 1, the size of the tone mapping field can be based on the number of different resource block allocation combinations in a given 20 MHz band. Thus, because there are 25 possible different resource block allocation combinations per band in FIG. 1, the tone mapping field may be represented as five bits (e.g., $2^5$=32 combinations).

Figure 2:
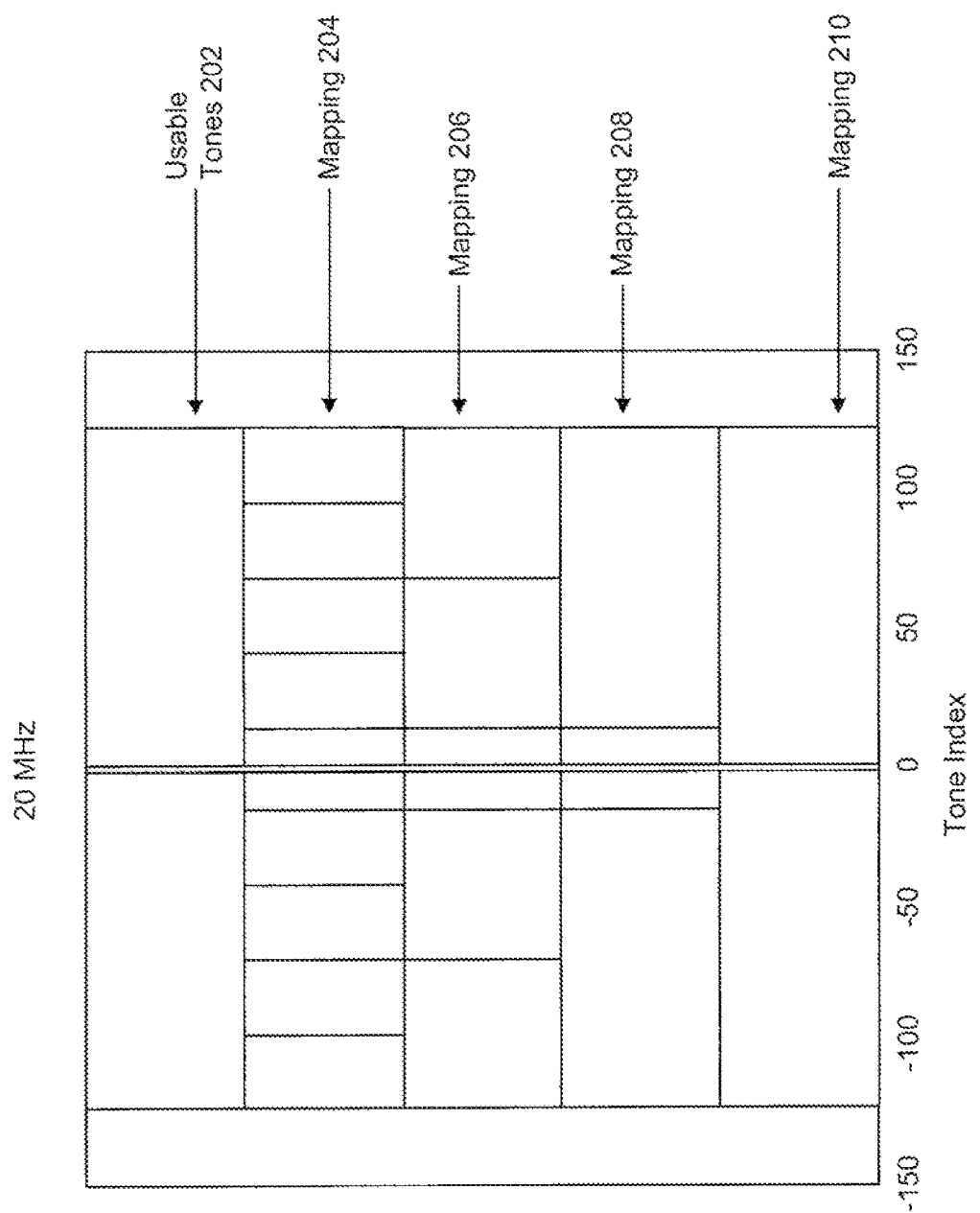
FIG. 2 is a block diagram of example tone mappings for a WLAN, according to some embodiments.

FIG. 2 is a block diagram of example tone mappings for to wireless local area network (WLAN), according to sonic embodiments. For example, in some embodiments, a WLAN may use a proposal for the IEEE 802.11ax standard. However, a person of ordinary skill in the art would appreciate that this tone mapping signaling technique also may be used with other wireless communications protocols and modulation schemes. In FIG. 2, examples of possible tone mappings for a 20 MHz channel are shown.

In FIG. 2, usable tones 202 represent the total number of tones present in the 20 MHz band, according to some embodiments. For example, usable tones 202 may represent 256 total tones of which 242 are available for data transmission.

In FIG. 2, the 20 MHz band may be divided into, e.g., a maximum 9 resource blocks containing 26 data tones each. In other words, in some embodiments, up to 9 receivers may be assigned to the 20 MHz band. This tone mapping is represented as mapping 204.

In FIG. 2, in some embodiments, the 20 MHz band may be divided into 4 resource blocks of 52 data tones each and 1 resource block of 26 data tones. This tone mapping is represented as mapping 206. In some embodiments, the 20 MHz band may be divided into 2 resource blocks of 106 data tones each and a resource block of 26 data tones. This tone mapping is represented as mapping 208. Finally, in another example, 242 data tones of the 20 MHz band may be assigned to one resource block. This tone mapping is represented as mapping 210. Other mappings also are possible.

In some embodiments, because the tone mapping field of HE-SIG-B is associated with a specific 20 MHz band, the size of the tone mapping field only needs to be large enough to represent the resource block allocations for that 20 MHz band. Thus, with resource blocks of 26, 52, 106, and 242 tone sizes, there are at most 25 resource block allocations. Thus, the tone mapping field size should be at least five bits to permit identifying those 25 resource block allocations, as $2^5$=32 combinations.

With respect to the 25 resource block allocations illustrated in FIG. 2, there is one case in which there 9 resource blocks of 26 tones each. There are 4 cases in which there is 1 resource block of 52 tones and 7 resource blocks of 26 tones each. There are 6 cases in which there are 2 resource blocks of 52 tones each and 5 resource blocks of 26 tones each. There are 4 cases in which there are 3 resource blocks of 52 tones each and 3 resource blocks of 26 tones each. There are 8 cases in which there is 1 resource block of TBD number of tones and other resource block combinations. There is 1 case in which the whole 20 MHz band is allocated to a single resource block. It is also possible to aggregate adjacent 20 MHz bands for 40 MHz allocation.

Figure 3:
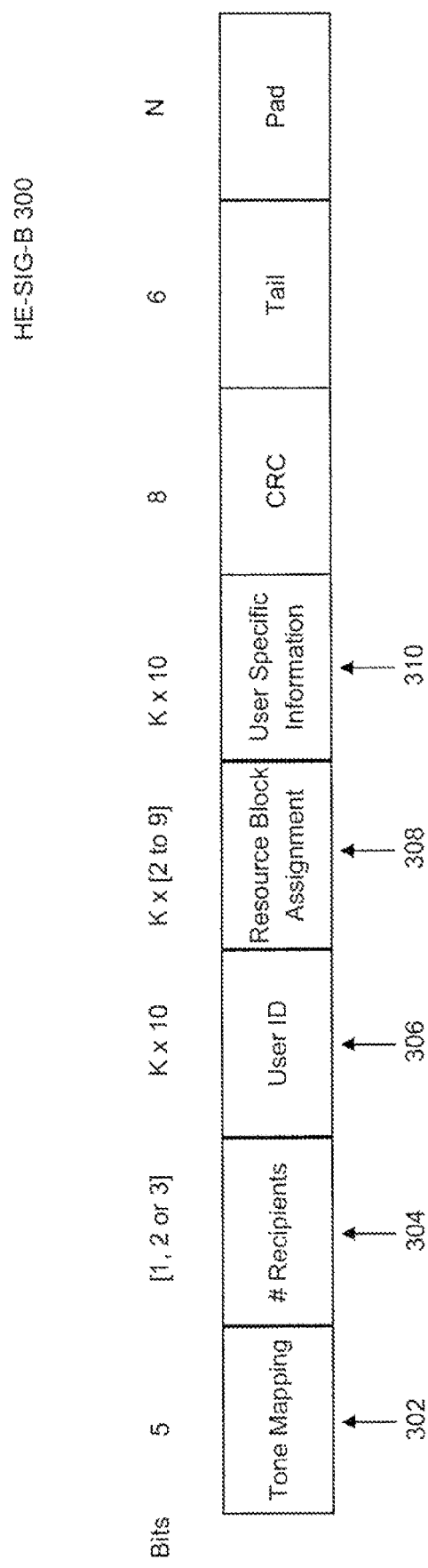
FIG. 3 is a block diagram of an example HE-SIG-B field that indicates resource block assignment for a 20 MHz band for a WLAN, according to some embodiments.

FIG. 3 is a block diagram of an example HE-SIG-B 300 field that indicates resource block assignments for a WLAN, according, to some embodiments. For example, in some embodiments, a WLAN may use a proposal for the IEEE 802.11ax standard or various other wireless communications protocols. In some embodiments, HE-SIG-B 300 field may be transmitted according to an OFDMA multicarrier modulation scheme. A person of ordinary skill in the art would appreciate that this resource block assignment technique may be used with other wireless communication protocols and modulation schemes. In FIG. 3, HE-SIG-B 300 is transmitted over a specific 20 MHz band of an 80 MHz channel.

In some embodiments, HE-SIG-B 300 includes a tone mapping field 302, a number of recipients field 304, a user identification field 306, an assignment field 308, and a user specific information field 310. In addition, HE-SIG-B 300 may include several additional subfields. Specifically, HE-SIG-B 300 field may include a cyclic redundancy check (CRC) subfield to detect a data transmission error, a tail subfield to allow a convolutional coder to complete, and a padding subfield for data alignment purposes.

In some embodiments, tone mapping field 302 may represent the tone mapping combination for the 20 MHz band using a unique value. In FIG. 3, tone mapping field 302 may be five bits to permit identifying 25 resource block allocations as $2^5$=32 combinations.

In some embodiments, number of recipients field 304 may represent the number of user receiver devices, e.g., K, for the 20 MHz band. In FIG. 3, number of recipients field 304 may be 3 bits to permit up to 8 user receiver devices, e.g., $2^3$=8 combinations.

In some embodiments, user identification field 306 may uniquely represent K user receiver devices. The K user receiver devices may be stored in turn in user identification field 306. In some embodiments, user identification field 306 may indicate a receiver device using a user identifier, a coded media access control, or a media access control (MAC) address. In FIG. 3, user identification field 306 may be K*10 bits in length where K is the number of user receiver devices stored in number of recipients field 304 and a user receiver device identifier is 10 bits.

In some embodiments, assignment field 308 may identify which resource blocks are assigned to which user receiver devices. Assignment field 308 may store K assignments of resource blocks to user receiver devices. The K resource block assignments may be stored in assignment field 308. In addition, the K resource block assignments may be stored in the same order as the corresponding user receiver devices are stored in user identification field 306.

In some embodiments, assignment field 308 may be K*N bits in length where K is the number of user receiver devices stored m number of recipients field 304 and N is the number of resource blocks available in the resource block allocation indicated by tone mapping field 302. In FIG. 3, assignment field 308 may be K*[2 to 9] bits in length because there may be between 2 and 9 resource blocks available in the 20 MHz band of the channel based on the resource block allocation indicated in tone map field 302.

In some embodiments, assignment field 308 may identify the assignment of resource blocks to user receiver devices directly by resource block number according to the resource block allocation indicated by tone mapping field 302. In some embodiments, assignment field 308 may identify the assignment of resource blocks to user receiver devices using a bitmap.

In some embodiments, HE-SIG-B 300 field may include user specific information field 310. User specific information field 310 may contain K subfields of user specific information. The K subfields of user specific information may be stored in user specific information field 310. In addition, K subfields of user specific information may be stored in the same order as the corresponding user receiver devices stored in user identification field 306. In FIG. 3, user specific information field 310 may be K*10 bits in length where K is the number of user receiver devices stored in number of recipients field 304 and a user receiver device identifier is 10 bits. User specific information field 310 may indicate a coding scheme, a number of space-time streams, a beamforming indication, a modulation-and-coding (MCS) scheme, etc., for each user receiver device to decode or otherwise determine an assigned resource block.

In some embodiments, user specific information field 310 may indicate a resource block is assigned to multiple user receiver devices. Specifically, user specific information field 310 may include a multi-user multiple-input multiple-output (MU-MIMO) flag indicating that a resource block may be assigned to multiple user receiver devices, in some embodiments, the MU-MIMO flag may be valid only when assignment field 308 indicates a user receiver device occupies one or more 20 MHz bands of the channel bandwidth.

Figure 4:
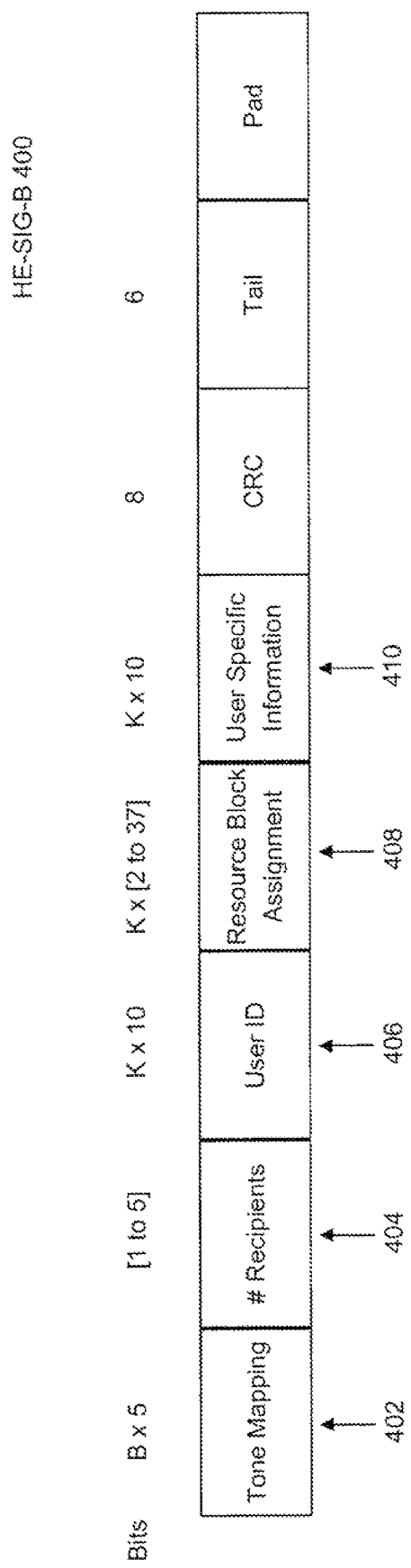
FIG. 4 is a block diagram of an example HE-SIG-B field that indicates resource block assignment for an entire bandwidth of a channel for a WLAN, according to some embodiments.

FIG. 4 is a block diagram of a HE-SIG-B 400 field that indicates resource block assignment for a WLAN, according to some embodiments. For example, in some embodiments, a WLAN may use a proposal for the IEEE 802.11ax standard or various other wireless communications protocols. In some embodiments, HE-SIG-B 400 field may be transmitted according to an OFDMA multicarrier modulation scheme. A person of ordinary skill in the art would appreciate that this resource block assignment technique may be used with other wireless communications protocols and modulation schemes. In FIG. 4, HE-SIG-B 400 is transmitted across the entire bandwidth of an 80 MHz channel.

In some embodiments, HE-SIG-B 400 includes a tone mapping field 402, a number of recipients field 404, a user identification field 406, an assignment field 408, and a user specific information field 410. In addition, HE-SIG-B 400 may include several additional subfields. Specifically, HE-SIG-B 400 field may include a CRC subfield to detect a data transmission error, a tail subfield to allow a convolutional coder to complete, and a padding subfield for data alignment purposes.

In some embodiments, tone mapping field 402 may represent the tone mapping combination across the entire channel bandwidth using a unique value. In FIG. 4, tone mapping field 402 may be B*five bits in length, where B represents the total channel bandwidth.

In some embodiments, number of recipients field 404 may represent the number of user receiver devices, e.g., K, for the entire channel bandwidth. In FIG. 4, number of recipients field 404 may be five bits to permit up to 32 user receiver devices (e.g., $2^5$=32 combinations).

In some embodiments, user identification field 406 may uniquely represent K user receiver devices. The K user receiver devices may be stored in turn in user identification field 406. In some embodiments, user identification field 406 may indicate a user receiver device using a user identifier, a coded media access control, or a MAC address. In FIG. 4, user identification field 406 may be K*10 bits in length, where K is the number of user receiver devices stored in number of recipients field 404 and a user receiver device identifier is 10 bits.

In some embodiments, assignment field 408 may identify the assignment of resource blocks to user receiver devices. Assignment field 408 may store K assignments of resource blocks to user receiver devices. The K resource block assignments may be stored in assignment field 408. In addition, the K resource block assignments may be stored in the same order as the corresponding user receiver devices stored in user identification field 406.

In some embodiments, assignment field 408 may be K*N bits in length, where K is the number of user receiver devices stored in number of recipients field 404 and N is the number of resource blocks available in the resource block allocation indicated by tone mapping field 402. In FIG. 4, assignment field 408 may be K*[2 to 37] bits in length because there may be between 2 and 37 resource blocks available for the entire bandwidth of the channel based on the resource block allocation indicated in tone mapping field 402.

In some embodiments, assignment field 408 may identify the assignment of resource blocks to user receiver devices directly by resource block number according to the resource block allocation indicated in tone mapping field 402. In some other embodiments, assignment field 408 may identify the assignment of resource blocks to user receiver devices using a bitmap.

In some embodiments, HE-SIG-B 400 field may include user specific information field 410. User specific information field 410 may contain K subfields of user specific information. The K subfields of user specific information may be stored in user specific information field 410. In addition, K subfields of user specific information may be stored in the same order as the corresponding user receiver devices stored in user identification field 406. In FIG. 4, user specific information field 410 may be K*10 bits in length, where K is the number of user receiver devices stored in number of recipients field 404 and a user receiver device identifier is 10 bits. User specific information field 410 may indicate a coding scheme, a number of space-time streams, a beamforming indication, a modulation-and-coding (MCS) scheme, etc., for each user receiver device to decode or otherwise determine an assigned resource block.

In some embodiments, user specific information field 410 may indicate a resource block is assigned to multiple user receiver devices. Specifically, user specific information field 410 may include a MU-MIMO flag indicating that a resource block may be assigned to multiple user receiver devices. In some embodiments, the MU-MIMO flag may be valid only when assignment field 408 indicates a user receiver device occupies one or more 20 MHz bands of the channel bandwidth.

In some embodiments, an assignment field (e.g., assignment field 408) in a HE-SIG-B field (e.g., HE-SIG-B 400) may provide contiguous resource block assignment. Specifically, the assignment field may assign a single resource block to a single user receiver device. Thus, the assignment field may need only enough bits to indicate a location of a resource block in the resource block allocation indicated by a tone mapping field (e.g., tone mapping field 402) in the HE-SIG-B field.

In some embodiments, an assignment field (e.g., assignment field 408) in a HE-SIG-B field (e.g., HE-SIG-B 400) may provide non-contiguous resource block assignment. Specifically, the assignment field may assign multiple resource blocks to a single user receiver device. The assignment field may assign the multiple resource blocks in any combination across the resource block allocation indicated by a tone mapping field (e.g., tone mapping field 402) in the HE-SIG-B field. In some embodiments, the assignment field may provide non-contiguous resource block assignment using a bitmap.

Figure 5:
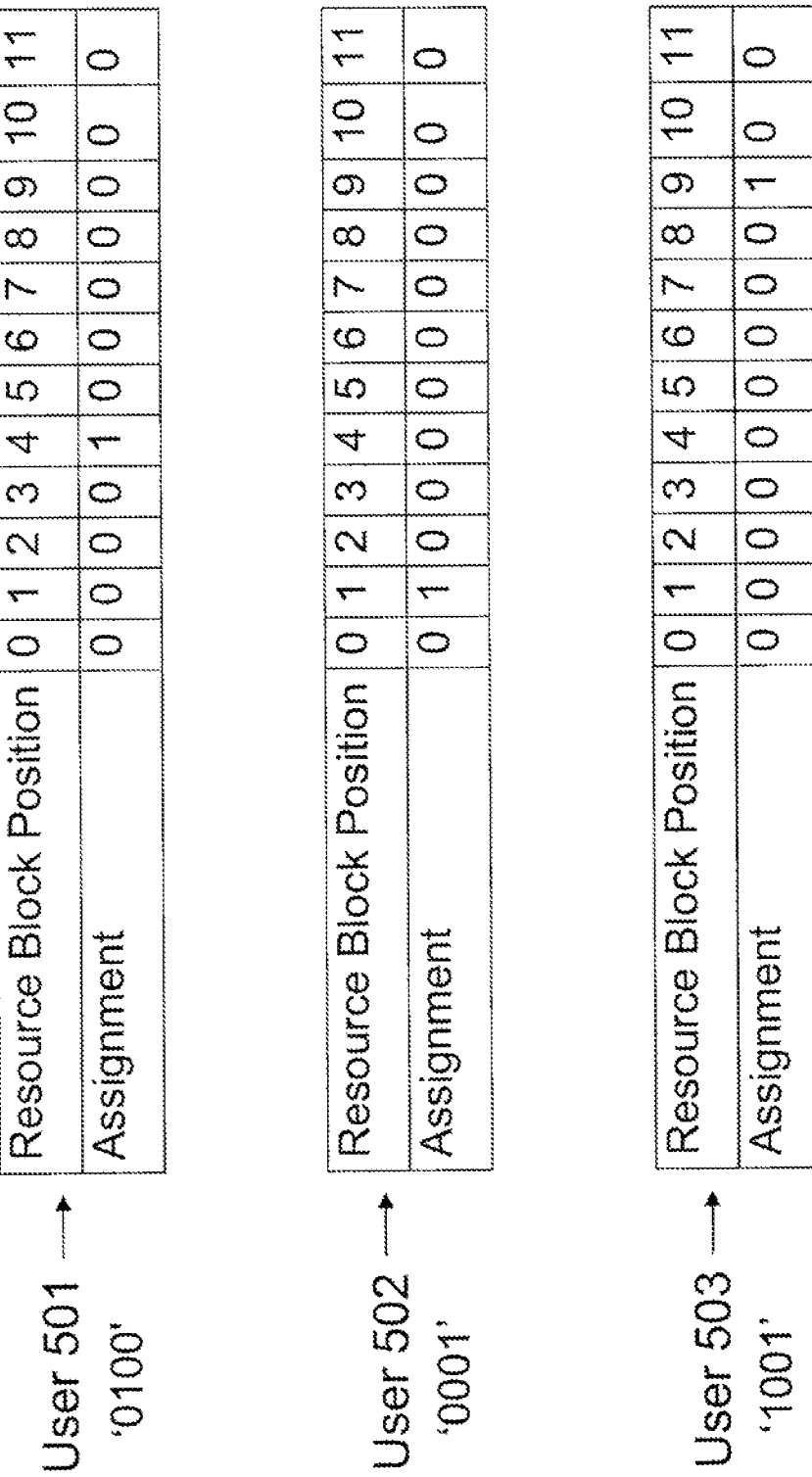
FIG. 5 is a block diagram of an example contiguous resource block assignment for a WLAN, according to some embodiments.

FIG. 5 is a block diagram of an example contiguous resource block assignment for a WLAN, according to some embodiments. For example, in some embodiments, a WLAN may use a proposal for the IEEE 802.11ax standard. A person of ordinary skill in the art would appreciate that this resource block assignment technique also may be used with other wireless communications protocols and modulation schemes. In FIG. 5, the example contiguous resource block assignment is for a 20 MHz band of a channel.

In FIG. 5, there are 12 resource blocks available for assignment, according to some embodiments. In some embodiments, the number of resource blocks available for assignment may be determined based on a resource allocation combination indicated in a tone mapping field (e.g., tone mapping field 402) of a HE-SIG-B field (e.g., HE-SIG-B 400).

In FIG. 5, there are three user receiver devices available for resource block assignment: user 501, user 502, and user 503. In some embodiments, the total number of user receiver devices available for resource block assignment may be specified in a number of recipients field (e.g., number of recipients field 404) of a HE-SIG-B field (e.g., HE-SIG-B 400). In some embodiments, resource block assignments are stored in an assignment field (e.g., assignment field 408) of the HE-SIG-B field. In some embodiments, the order of resource block assignments may correspond to the order of user receiver devices specified in a user identification field (e.g., user identification field 406) of the HE-SIG-B field.

In FIG. 5, user 501, user 502, and user 503 are each assigned a single resource block. In some embodiments, the assignment of resource blocks to a user receiver device may be represented as a bitmap: a bit location of an assigned resource block in a resource block allocation is set to '1' and a bit location of an unassigned resource block in the resource block allocation is set to '0'. For example, in FIG. 5, user 501 is assigned resource block 4, user 502 is assigned resource block 1, and user 503 is assigned resource block 9. In FIG. 5, there are 9 resource blocks that are unassigned to user receiver devices.

In FIG. 5, according to some embodiments, because resource block assignment is contiguous, a bit location of an assigned resource block may be directly represented as a resource block number. Specifically, a bit length of a resource block assignment may need to be only large enough to represent the total number of resource blocks available in the resource block allocation. Thus, in FIG. 5, only 4 bits are needed liar resource block assignment because $2^4=16$ and there are 12 resource blocks available for assignment.

For example, in FIG. 5, the assignment of resource block 4 to user 501 may be represented as '0100', e.g., 4. The assignment of resource block 1 to user 502 may be represented as '0001', e.g., 1. Finally, the assignment of resource block 9 to user 503 may be represented as '1001', e.g., 9.

FIG. 6 is a block diagram of an example non-contiguous resource block assignment for a WLAN, according to some embodiments. For example, in some embodiments, a WLAN may use a proposal for the IEEE 802.11ax standard. A person of ordinary skill in the art would appreciate that this resource block assignment technique also may he used with other wireless communications protocols and modulation schemes. In FIG. 6, the example non-contiguous resource block assignment is for a 20 MHz band of a channel.

In FIG. 6, there are 12 resource blocks available for assignment. In some embodiments, the number of resource blocks available for assignment may be determined based on a resource allocation combination specified in a tone mapping field (e.g., tone mapping field 402), of a HE-SIG-B field (e.g., HE-SIG-B 400).

In FIG. 6, there are three user receiver devices available for resource block assignment: user 601, user 602, and user 603. In some embodiments, the total number of user receiver devices available for resource block assignment may be specified in the number of recipients field (e.g., number of recipients field 404) of a HE-SIG-B field (e.g., HE-SIG-B 400). In some embodiments, resource block assignments are stored in an assignment field (e.g., assignment field 408) of the HE-SIG-B field. In some embodiments, the order of resource block assignments may correspond to the order of user receiver devices specified in an user identification field (e.g., user identification field 4061 of the HE-SIG-B field.

In FIG. 6, user 601 and user 602 are each assigned multiple resource blocks while user 603 is only assigned a single resource block. In some embodiments, the assignment of resource blocks to a user receiver device may be represented as a bitmap: a bit location of an assigned resource block in a resource block allocation is set to '1' and a bit location of an unassigned resource block in the resource block allocation is set to '0'.

In FIG. 6, according to some embodiments, because resource block assignment is non-contiguous, resource block assignments may be represented as a series of bitmaps. Specifically, bit locations of assigned resource blocks in to bitmap for a user receiver device are removed from consideration in a next bitmap for a next user receiver device. This storage process continues until all bitmaps for all user receiver devices are stored.

For example, in FIG. 6, user 601 is assigned resource blocks 0, 3, 4, 6, 9, and 11 as indicated by its bitmap. Because user 601 is the first user receiver device and there are 12 resource blocks available for assignment, user 601 requires a bitmap of 12 bits in length.

In FIG. 6, user 602 is assigned resource blocks 2, 5, 8, and 10. User 602, however, may be represented as a bitmap of only 6 bits. This is because resource blocks 0, 3, 4, 6, 9, and 11 were already assigned to user 601. As a result, the corresponding bit locations for these resource blocks do not need to be represented in the bitmap for user 602. Thus, user 602 may be represented as a bitmap containing only bit locations 1, 2, 5, 7, 8, and 10.

In FIG. 6, user 603 is assigned resource blocks 1 and 7. User 603, however, may be represented as a bitmap of only 2 bits. This is because resource blocks 0, 3, 4, 6, 9, and 11 were assigned to user 601 and resource blocks 2, 5, 8, and 10 were assigned to user 602. As a result, the corresponding bit locations for these resource blocks do not need to be represented in the bitmap for user 603. Thus, user 603 may be represented as a bitmap containing only bit locations 1 and 7.

In FIG. 6, because bit locations of assigned resource blocks in a bitmap for a user receiver device are removed from consideration in a next bitmap for a next user receiver device, the amount of bits that may be needed to represent the assignment of resource blocks is reduced. This means a smaller preamble size for transmission. This may decrease power consumption, which in turn may increase battery life in a portable device. Moreover, less compute processing may be necessary to decode a preamble smaller in size. This may also decrease power consumption.

Figure 7:
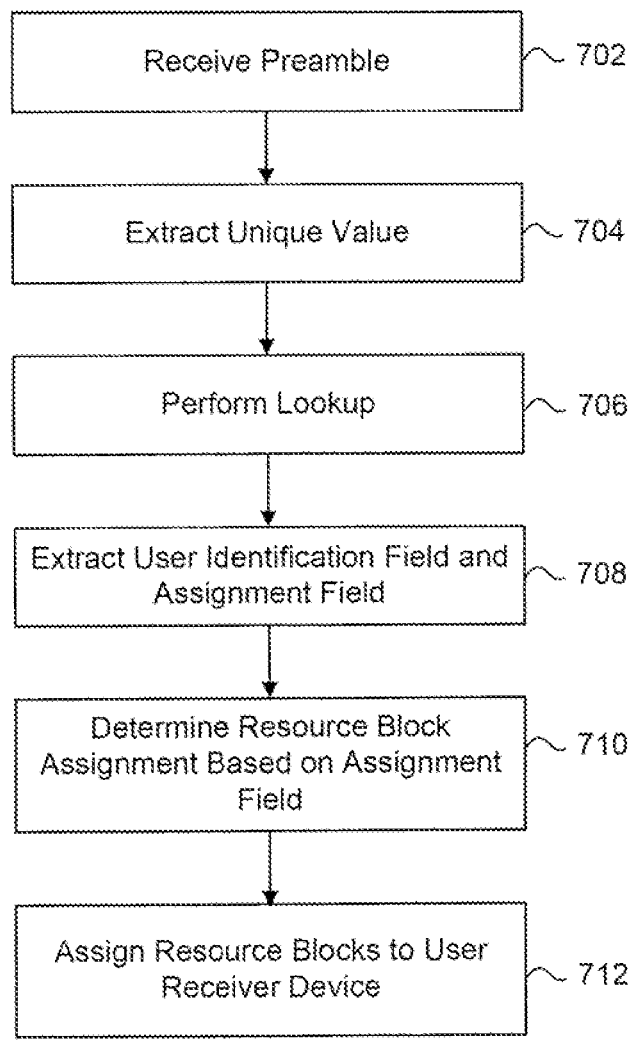
FIG. 7 is a flowchart illustrating an example of performing resource block assignment to user receiver devices, according to some embodiments.

FIG. 7 is a flowchart for an example method 700 for assignment of resource blocks to user receiver devices, according to some embodiments. Method 700 can be performed by processing logic that can include hardware (e.g., circuitry, dedicated logic, programmable logic, microcode, etc.), software (e.g., instructions executing on a processing device), or a combination thereof.

In 702, a receiving device receives a preamble of a frame for a wireless communications protocol. The preamble includes a tone mapping field, a user identification field, and an assignment field. In some embodiments, the tone mapping field, the user identification field, and the assignment field may be stored in an HE-SIG-B field, e.g., according to a proposal for the IEEE 802.11ax standard.

The tone mapping field may be associated with a portion of a tone space. For example, in some embodiments, the tone mapping field may be, e.g., 5 bits in size, and the portion of the tone space may be associated with a 20 MHz band of a channel. In some embodiments, the tone space may be based on an 80 MHz channel. As would be appreciated by a person of ordinary skill in the art, other combinations are possible for the tone space.

In 704, the receiving device extracts a unique value from the tone mapping field. An example description of "unique value" can be found in paragraphs [0034], [0046], and [0047] of U.S. patent application Ser. No. 15/133,952, titled "Tone Mapping Signaling in a Preamble" and filed on Apr. 20, 2016. The description of U.S. patent application Ser. No. 15/133,952 with respect to "unique value" is incorporated herein by reference.

In 706, the receiving device uses the extracted unique value to lookup the corresponding resource block allocation in a lookup table. As would be appreciated by a person of ordinary skill in the art, the actual resource block allocation may be encoded in the lookup table in various ways. Moreover, as would be appreciated by a person of ordinary skill in the art, the lookup table may be implemented as a hash table, array, linked list, or various other data structures.

In 708, the receiving device extracts the user identification field and the assignment field from the preamble. In some embodiments, the receiving device extracts the user identification field and the assignment field based on the determined resource block allocation of 706.

In 710, the receiving device determines the assignment of resource blocks to itself based on the user identification field and the assignment field of 708. In some embodiments, the assignment field may store K assignments of resource blocks to user receiver devices. The K resource block assignments may be stored in the assignment field. In addition, the K resource block assignments may be stored in the same order as the corresponding user receiver devices stored in the user identification field. Thus, in some embodiments, the receiving device extracts a portion of the assignment field corresponding to the user receiver device in the user identification field.

In some embodiments, the assignment field may represent a contiguous resource block assignment. The receiving device may determine a resource block assignment based directly on a resource block number stored in the extracted portion of the assignment field. In some embodiments, the receiving device may calculate the bit length of the extracted portion of the assignment field based on the determined resource block allocation of 706.

In some other embodiments, the assignment field may represent a non-contiguous resource block assignment. The receiving device may determine a resource block assignment based on a series of bitmaps stored in the assignment field. Specifically, the receiving device may determine a resource block assignment for as user receiver device by extracting the series of bitmaps from the assignment field. In some embodiments, the receiving device may calculate the length of each bitmap in the assignment field based on the determined resource block allocation of 706.

In some embodiments, the receiving device may determine the assigned resource blocks for a first user receiver device from the corresponding bitmap in the assignment field. The receiving device may also calculate the unassigned resource blocks for the first user receiver device. The receiving device may then remove from consideration the assigned bit locations from the corresponding bitmap for the next user receiver device in the assignment field. The receiving device then determines the assigned resource blocks for a next riser receiver device in view of the removed bit locations from the corresponding bitmap.

In 712, the receiving device assigns resource blocks to itself based on the determination in 710.

Figure 8:
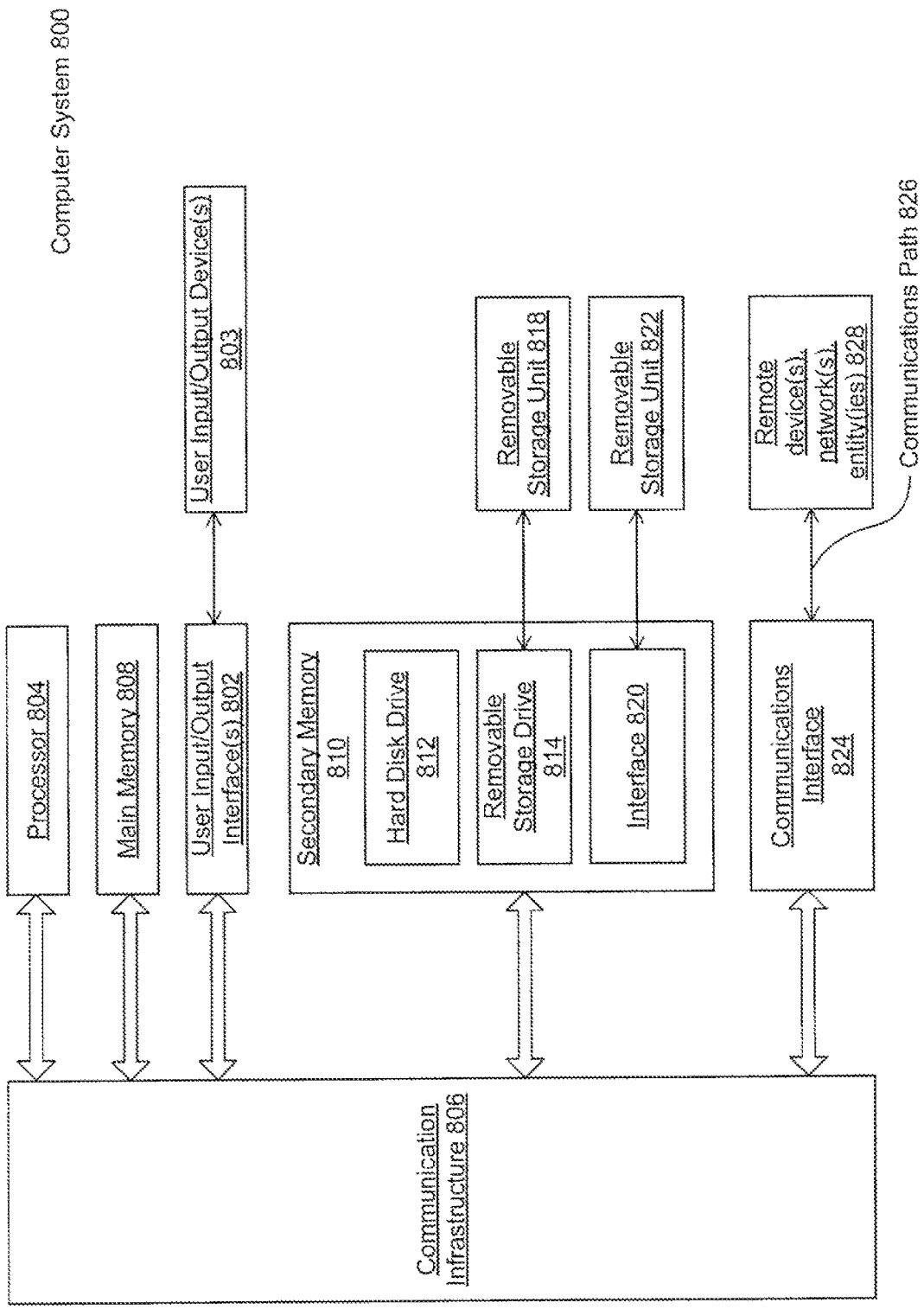
FIG. 8 is an example computer system for implementing various embodiments.

Various embodiments can be implemented, for example, using one or more computer systems, such as computer system 800 shown in FIG. 8. Computer system 800 can be used, for example, to implement method 700 of FIG. 7. For example, computer system 800 can determine a resource block allocation of a portion of a tone space using a lookup table. Computer system 800 can further assign resource blocks to user receiver devices based on the determined resource block allocation and an assignment field, according to some embodiments. Computer system 800 can be any computer capable of performing the functions described herein.

Computer system 800 includes one or more processors (also called central processing units, or CPUs), such as a processor 804. Processor 804 is connected to a communication infrastructure or bus 806.

One or more processors 804 may each be a graphics processing unit (CPU). In embodiments, a CPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 also includes user input/output device(s) 803, such as monitors, keyboards, pointing devices, etc., that communicate with communication infrastructure 806 through user input/output interface(s) 802.

Computer system 800 also includes a main or primary memory 808, such as random access memory (RAM). Main memory 808 may include one or more levels of cache. Main memory 808 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818.

According to some embodiments, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In some embodiments, a tangible apparatus or article of manufacture including a tangible computer useable or readable medium having control logic (software) stored thereon is also referred to herein as a "computer program product" or "program storage device." This includes, but is not limited to, computer system 800, main memory 808, secondary memory 810, and removable storage units 818 and 822, as well as tangible articles of manufacture embodying any combination of the foregoing. Such control logic, when executed by one or more data processing devices (e.g., computer system 800), causes such data processing devices to operate as described herein.

Based on the teachings contained in this disclosure, it will be apparent to persons skilled in the relevant art(s) how to make and use embodiments of the disclosure herein using data processing devices, computer systems and/or computer architectures other than that shown in FIG. 8. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections of any) may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment" or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

What is claimed is:

1. A computer implemented method for assigning a resource block to a receiver device for a wireless communications protocol, comprising:
receiving, by at least one processor, a preamble of a frame corresponding to the wireless communications protocol, wherein the preamble comprises a tone mapping field, a first user identification field, a second user identification field, a first assignment field, and a second assignment field;
extracting, by the at least one processor, the first assignment field from the preamble based at least in part on a particular resource block mapping, wherein the first assignment field corresponds to an other receiver device;
calculating, by the at least one processor, an unassigned resource block number for the other receiver device from the first assignment field;
extracting, by the at least one processor, the second user identification field and the second assignment field from the preamble based at least in part on the unassigned resource block number;
determining, by the at least one processor, an assigned resource block number for the receiver device based at least in part on the second assignment field; and
assigning, by the at least one processor, a resource block corresponding to the assigned resource block number to the receiver device, wherein the second user identification field corresponds to the receiver device.

2. The method of claim 1, wherein the wireless communications protocol uses an orthogonal frequency-division multiple access (OFDMA) modulation scheme.

3. The method of claim 1, wherein the tone mapping field, the first user identification field, and the first assignment field are stored in a high-efficiency-signal-B (HE-SIG-B) field of the preamble.

4. The method of claim 3, wherein the HE-SIG-B field corresponds to a 20 MHz band.

5. The method of claim 3, wherein the HE-SIG-B field is encoded across a channel for the wireless communications protocol.

6. The method of claim 1, further comprising:
calculating, by the at least one processor, a size of the first assignment field based at least in part on the particular resource block mapping.

7. The method of claim 1, wherein the first assignment field comprises a bitmap.

8. The method of claim 1, wherein the determining the assigned resource block number comprises:
retrieving, by the at least one processor, the assigned resource block number from a lookup table based at least in part on the second assignment field, wherein the lookup table is based at least in part on the particular resource block mapping.

9. A system, comprising:
a memory; and
at least one processor coupled to the memory and configured to:
receive a preamble of a frame corresponding to a wireless communications protocol, wherein the preamble comprises a tone mapping field, a first user identification field, a second user identification field, a first assignment field, and a second assignment field;
extract the first assignment field from the preamble based at least in part on a particular resource block mapping, wherein the first assignment field corresponds to an other system;
calculate an unassigned resource block number for the other system from the first assignment field;
extract the second user identification field and the second assignment field from the preamble based at least in part on the unassigned resource block number; and
determine an assigned resource block number for the system based at least in part on the second assignment field.

10. The system of claim 9, wherein the at least one processor is further configured to:
assign a resource block corresponding to the assigned resource block number to the system, wherein the second user identification field corresponds to the system.

11. The system of claim 9, wherein the wireless communications protocol uses an orthogonal frequency-division multiple access (OFDMA) modulation scheme.

12. The system of claim 9, wherein the tone mapping field, the first user identification field, and the first assignment field are stored in a high-efficiency-signal-B (HE-SIG-B) field of the preamble.

13. The system of claim 9, wherein the at least one processor is further configured to:
calculate a size of the first assignment field based at least in part on the particular resource block mapping.

14. A non-transitory computer-readable device having instructions stored thereon that, when executed by at least one computing device, cause the at least one computing device to perform operations comprising:
receiving a preamble of a frame corresponding to a wireless communications protocol, wherein the preamble comprises a tone mapping field, a first user identification field, a second user identification field, a first assignment field, and a second assignment field;
calculating a size of the first assignment field based at least in part on a particular resource block mapping;
extracting the first assignment field from the preamble based at least in part on a size of the first assignment field and the particular resource block mapping, wherein the first assignment field corresponds to an other computing device;
calculating an unassigned resource block number for the other computing device from the first assignment field;
extracting the second user identification field and the second assignment field from the preamble based at least in part on the unassigned resource block number;
determining an assigned resource block number for the at least one computing device based at least in part on the second assignment field; and
assigning a resource block corresponding to the assigned resource block number to the at least one computing device, wherein the second user identification field corresponds to the at least one computing device.

15. The non-transitory computer-readable device of claim 14, wherein the wireless communications protocol uses an orthogonal frequency-division multiple access (OFDMA) modulation scheme.

16. The non-transitory computer-readable device of claim 14, wherein the tone mapping field, the first user identification field, and the first assignment field are stored in a high-efficiency-signal-B (HE-SIG-B) field of the preamble.

17. The non-transitory computer-readable device of claim 14, wherein the determining the assigned resource block number comprises:
  retrieving the assigned resource block number from a lookup table based at least in part on the second assignment field, wherein the lookup table is based at least in part on the particular resource block mapping.

* * * * *